(12) United States Patent
Favaretto

(10) Patent No.: US 12,173,641 B2
(45) Date of Patent: Dec. 24, 2024

(54) FORCED INDUCTION DEVICE FOR AN INTERNAL COMBUSTION ENGINE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/544,844

(22) Filed: Dec. 19, 2023

(65) Prior Publication Data

US 2024/0209772 A1 Jun. 27, 2024

(30) Foreign Application Priority Data

Dec. 22, 2022 (IT) .......................... 102022000026403

(51) Int. Cl.
*F02B 39/04* (2006.01)
*F02B 37/10* (2006.01)
*F02B 37/12* (2006.01)

(52) U.S. Cl.
CPC .............. *F02B 39/04* (2013.01); *F02B 37/10* (2013.01); *F02B 37/12* (2013.01)

(58) Field of Classification Search
CPC ........... F02B 39/04; F02B 37/10; F02B 37/12
See application file for complete search history.

(56) References Cited

U.S. PATENT DOCUMENTS 7,958,727 B2   6/2011  Arnold
8,915,082 B2*  12/2014 Sun ......................... F02B 39/08
                                                             60/605.2
2014/0311463 A1* 10/2014 Hayashi ................... F02B 39/04
                                                             123/561
2018/0202353 A1*  7/2018 Favaretto ............ F02D 41/0007
2022/0298979 A1*  9/2022 Fulton ................. F02D 13/0246

FOREIGN PATENT DOCUMENTS

DE        1751941 A1     9/1970
DE       19732543 A1 *   2/1999    .............. F02B 37/04
DE       19924918 A1    12/2000

OTHER PUBLICATIONS

Machine Translation of DE-19732543-A1 (Year: 1999).*
Italian Search Report for Application No. 202200026403; Filing Date: Dec. 22, 2022; Date of Mailing: Jun. 23, 2023; 6 pages.

* cited by examiner

*Primary Examiner* — Brandon D Lee
(74) *Attorney, Agent, or Firm* — CANTOR COLBURN LLP

(57) ABSTRACT

A forced induction device for an internal combustion engine includes a compressor operable to provide compressed air, an intake line configured to supply an intake manifold of the internal combustion engine with the compressed air provided by the compressor, a turbine configured to generate mechanical power through expansion of at least a portion of exhaust gases of the internal combustion engine, an exhaust line configured to supply the turbine with the exhaust gas portion coming from an exhaust manifold of the internal combustion engine, characterized by further comprising a hydrostatic transmission configured to drive the compressor by means of the mechanical power generated by the turbine.

6 Claims, 1 Drawing Sheet

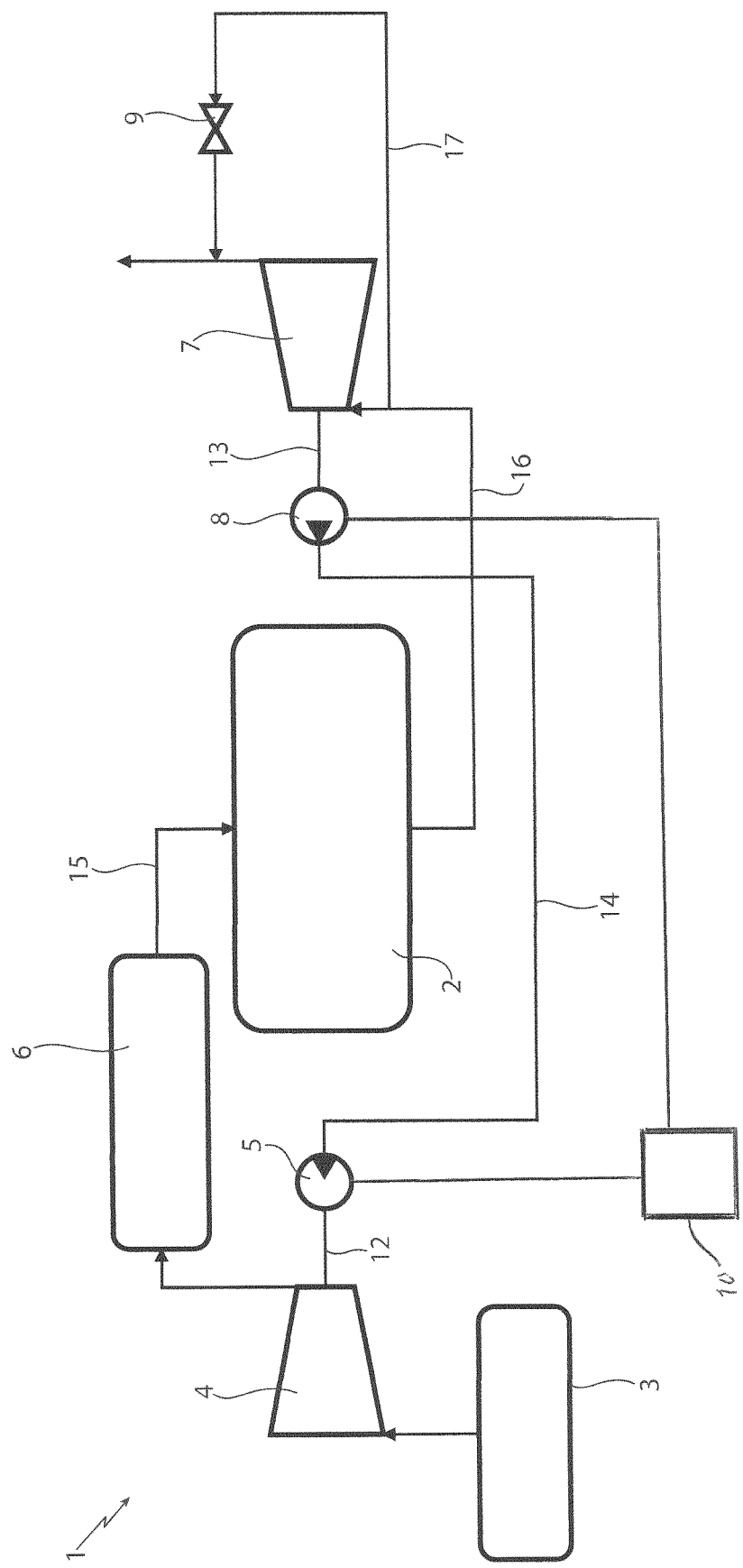

FORCED INDUCTION DEVICE FOR AN INTERNAL COMBUSTION ENGINE

CROSS-REFERENCE TO RELATED APPLICATIONS

This patent application claims priority from Italian patent application no. 102022000026403 filed on Dec. 22, 2022, the entire disclosure of which is incorporated herein by reference.

TECHNICAL FIELD

The invention concerns a forced induction device for an internal combustion engine.

PRIOR ART

It is known that some vehicles are provided with a forced induction engine, namely an internal combustion engine that receives precompressed air in the intake manifold.

The intake manifold air can be compressed for example by means of a turbocharger, namely a device comprising a turbine and a compressor fitted on the same shaft, so that the turbine can supply power to the compressor.

The power supplied to the compressor is generated by the turbine by the expansion of at least a portion of the exhaust gases, which is channelled through the turbine.

The remaining portion of the exhaust gases bypasses the turbine and is directly conveyed towards the after-treatment system of the engine.

The bypass is typically regulated by a valve commonly known as wastegate.

In general, although turbochargers are widely used for the forced induction of engines, the need is felt for an improvement in this field.

In particular, forced induction is an important aspect for determining the efficiency and performance of the engine, hence the need is felt to increase or even optimize efficiency and performance.

More specifically, the need is felt to improve the known turbochargers, specifically considering also questions relating to overall dimensions, weights and necessary costs.

An object of the invention is to meet at least one of the above needs, preferably in a simple reliable manner.

DESCRIPTION OF THE INVENTION

The object is achieved by a forced induction device for an internal combustion engine, as defined in claim 1.

The dependent claims define particular embodiments of the invention.

BRIEF DESCRIPTION OF THE DRAWINGS

Below, an embodiment of the invention is described for a better understanding thereof by way of non-limiting example and with reference to the attached FIG. 1, in which a diagram of an engine of a vehicle is illustrated with a forced induction device according to the invention.

EMBODIMENTS OF THE INVENTION

In FIG. 1, the reference number 1 is used to indicate, overall, a vehicle, specifically a motor vehicle, in particular a sports or racing vehicle.

The motor vehicle 1 comprises:
an internal combustion engine 2,
a filter 3 to filter the air outside the motor vehicle 1,
a compressor 4 connected to the filter 3 to receive air at the intake, in particular air at ambient pressure, and configured to supply compressed air at the outlet,
a hydraulic motor 5 arranged or configured to drive the compressor 4,
an intercooler 6, arranged or configured to cool the compressed air from the compressor 4 and to supply the cooled compressed air to the engine 2,
a turbine 7 connected to the engine 2 to receive a flow of exhaust gases of the engine 2 and configured to expand the exhaust gases, thus generating mechanical power at the outlet,
a hydraulic pump 8 arranged or configured to be driven by the mechanical power at the outlet of the turbine 7 and to supply a liquid under pressure to the hydraulic motor 5, and
a pressure valve or wastegate 9, for example of known type, configured to regulate the flow of exhaust gases towards the turbine 7 and a flow of exhaust gases that bypasses the turbine 7.

For example, any one or more of the filter 3, intercooler 6, and even the wastegate 9 are entirely optional and can therefore be absent.

The assembly formed by the compressor 4, the hydraulic motor 5, the turbine 7 and the hydraulic pump 8 is part of a forced induction device for the engine 2.

In greater detail, the hydraulic motor 5 and the hydraulic pump 8 form part of a hydrostatic transmission configured to drive the compressor 4 by means of the power exiting the turbine 7.

More precisely, both or at least one of the hydraulic motor 5 and the hydraulic pump 8 is of the variable displacement type. In particular, the hydraulic pump 8 is a variable displacement pump.

Variable displacement is understood in this technical field as the quantity of fluid pumped or processed respectively for a complete rotation of the input shaft of the pump 8 or the output shaft of the motor 5.

In other words, both or at least one of the hydraulic motor 5 and the hydraulic pump 8 comprises a movable mechanical member (typically called swashplate), the position or movement of which determines the variable displacement.

Therefore, displacement defines a control variable of the pump 8 and/or of the motor 5.

Furthermore, the forced induction device comprises a control unit 10 configured to regulate the displacement of the hydraulic pump 8 or the hydraulic motor 5 or both, namely in particular their respective control variables.

The regulation can be performed for example by means of an actuator controlled by the control unit to move the above-mentioned movable member, thus varying the displacement.

In this way, in other words, the control unit is configured to control the compressor 4 or more precisely to regulate at least the speed at the output of the hydraulic motor 5, independently of the turbine 7.

In fact, the speed of the compressor 4 and the turbine 7 are directly influenced by the displacement of the motor 5 and the displacement of the pump 8 respectively.

The hydrostatic transmission defines a continuously variable transmission, namely a transmission that allows continuous regulation of the speed at the transmission output starting from any constant speed at the transmission inlet. In other words, the transmission ratio of the hydrostatic transmission, which connects the turbine 7 to the compressor 4, is continuously variable.

The hydraulic motor 5 is mechanically connected to the compressor 4 by means of a mechanical transmission, for example comprising or defined by a drive shaft 12, in particular defining an output shaft for the hydraulic motor 5 and an inlet shaft for the compressor 4.

Therefore, the compressor 4, or more precisely an impeller thereof, has an angular velocity directly depending on or corresponding to the speed at the output of the hydraulic motor 5, in turn, in particular, corresponding to the displacement of the motor 5.

Consequently, the control unit is configured to control the angular velocity of the compressor 4, in particular by controlling the displacement of the motor 5.

Furthermore, the control unit is also configured to control the turbine 7 or more precisely an output speed thereof.

The hydraulic pump 8 is mechanically connected to the turbine 7 by means of a mechanical transmission, for example comprising or defined by a drive shaft 13, in particular defining an output shaft for the turbine 7 and an inlet shaft for the hydraulic pump 8.

For example, the control unit controls the turbine 7 by means of a control of the wastegate 9. This is not limiting, however, since there are many ways of regulating the turbine 7 or the output speed thereof, for example by involving mechanical devices such as slip-control clutches, brakes, and the like.

Furthermore, the speed of the turbine 7 can also be controlled by controlling the displacement of the pump 8.

In practice, the turbine 7 and the compressor 4 are controllable independently of each other due to the hydrostatic transmission.

In particular, the control unit is configured to individually control the output speed from the turbine 7 and the input speed to the compressor 4, namely the angular velocity of the impeller, more in particular controlling the displacement of the motor 5 and the pump 8.

More in particular, the control unit preferably performs an independent control of the compressor 4 and the turbine 7, for example in a closed loop, for each of the compressor 4 and the turbine 7.

In practice, the control unit controls the compressor 4 and the turbine 7 according to respective independent control laws.

For example, each control law can be based on an optimization of the efficiency of the compressor 4 or the turbine, respectively. More precisely, each control law can be based on the solution to a problem of optimal control, in particular based in turn on maximization of a target function increasing with the performance or efficiency of the compressor 4 or the turbine 7 respectively.

Alternatively or additionally, the control unit controls the compressor 4 or more precisely the input speed to the compressor 4 with the sole objective of optimizing intake of the engine 2 according to the required performance (namely torque and power to be delivered by the engine 2); in other words, control of the compressor 4 is solely aimed at optimizing the combustion in the engine 2, namely its performance. Therefore, the control law with which the control unit controls the compressor 4 is based on optimization of the performance of the engine 2.

In practice, the control unit solves in general one or more problems of optimal control, namely by optimizing one or more target functions (maximizing or minimizing, based on the type of target function). The possible target functions can be various: for example, a target function could be a linear or non-linear combination of the efficiencies of the compressor 4 and the turbine 7, the overall energy expenditure of the engine 2, the difference between actual torque of the engine 2 and a target torque of the engine 2, and similar, in a non-limiting manner.

The target function or functions are a function of the speed of the compressor 4 and/or the speed of the turbine 7, so that the result of resolution of the problem of optimal control is a speed target for the compressor 4 and a speed target for the turbine 7.

More generally, the control unit is configured to determine or comprise (for example, since they are stored) the speed target for the compressor 4 and/or the speed target for the turbine 7.

The speed targets for the compressor 4 and for the turbine 7 will correspond to target values of the displacement of the motor 5 and/or the pump 8 respectively.

Therefore, the control unit is configured to control the displacement of the motor 5 and/or the pump 8, namely in a corresponding way the speed of the compressor 4 and/or the turbine 7, by means of respective control laws configured to minimize or reduce the relative differences between the target values and the actual displacements of the motor 5 and/or the pump 8. For example, the control laws can be in open loop, based on the target values, or in closed loop based on feedback signals of the displacements, which can for example be estimated or determined by appropriate transducers. For example, the control laws in closed loop could be PI or PID (proportional-integrative or proportional-integrative-derivative) control laws.

Correspondingly and implicitly, the control laws are configured to minimize or reduce the differences between the actual speeds of the compressor 4 and turbine 7 and the relative speed targets.

With greater reference to FIG. 1, the hydraulic motor 5 is hydraulically connected to the hydraulic pump 8 to receive the liquid provided by the latter. In particular, the connection is made through a duct or hydraulic circuit 14 of the forced induction device.

Furthermore, the forced induction device comprises an intake line 15 that connects an outlet for the compressed air of the compressor 5 to an intake manifold of the engine 2, in particular passing through the intercooler 6.

In practice, the intake line 15 is configured to supply the intake manifold with the compressed air emitted by the compressor 4.

In addition, the forced induction device comprises an exhaust line 16 that connects an exhaust manifold of the engine 2 to an inlet of the turbine 7.

Preferably, the forced induction device further comprises a bypass line 17 connected to the exhaust line 16 upstream of the turbine 7 and having an exhaust termination downstream of the turbine 7.

The bypass line 17 comprises for example the wastegate 9. The wastegate 9 is configured to split the exhaust gas flow through the bypass line 17, thus forcing a portion of the exhaust gases coming from the exhaust manifold of the engine 2 to pass through the turbine 7.

The control unit is configured to regulate splitting of the flow by means of the wastegate 9.

From the above, the advantages of the forced induction device according to the invention are evident.

The mechanical separation between the turbine 7 and the compressor 4 offers a considerable advantage, in particular due to a clearly increased controllability of the forced induction device compared to a traditional turbocharger.

In fact, since they are uncoupled, the turbine 7 and the compressor 4 can operate in respective independent regimes, thereby maximizing efficiency.

Furthermore, the use of a hydrostatic transmission is particularly advantageous, especially with respect to the use of electric components. The forced induction device is without electric machines like electric motors or alternators. This results in a significant advantage in terms of weight, overall dimensions and cost.

Lastly it is clear that modifications and variations that do not depart from the protective scope defined by the claims can be made to the forced induction device according to the invention.

In particular, each of the details included in the FIGURES is independent of the other details and is specifically designed to solve specific technical problems in isolation with respect to the other details.

The invention claimed is:

1. A forced induction device for an internal combustion engine (2), the device comprising
    a compressor (4) operable to provide compressed air,
    an intake line (15) configured to supply an intake manifold of the internal combustion engine (2) with the compressed air provided by the compressor (4),
    a turbine (7) configured to generate mechanical power through expansion of at least a portion of exhaust gases of the internal combustion engine (2),
    an exhaust line (16) configured to supply the turbine (7) with the exhaust gas portion coming from an exhaust manifold of the internal combustion engine (2),
    a hydrostatic transmission (5, 8, 14) configured to drive the compressor (4) by means of the mechanical power generated by the turbine (7), wherein the hydrostatic transmission comprises a hydraulic pump (8) coupled to the turbine (7), so that the mechanical power generated by the turbine (7) provides a liquid under pressure that drives the hydraulic pump (8), and a hydraulic motor (5) hydraulically connected to the hydraulic pump (8) to receive the liquid under pressure provided by the hydraulic pump (8) and coupled to the compressor (4) to drive the compressor (4) by means of the liquid under pressure received from the hydraulic pump (8), wherein both the hydraulic pump (8) and the hydraulic motor (5) are of a variable displacement type, and
    a control unit configured to control the hydraulic motor (5) and the hydraulic pump (8), thereby consequently controlling the compressor (4) independently of the turbine (7).

2. The forced induction device according to claim 1, wherein the control unit is configured to control the variable displacement of the hydraulic motor (5) of and the hydraulic pump (8).

3. The forced induction device according to claim 1, wherein the control unit is configured to control the compressor (4) through the hydraulic motor (5) and/or to control the turbine (7) according to respective independent control laws based on an optimization of the respective efficiencies of the compressor (4) and of the turbine (7), respectively.

4. The forced induction device according to claim 1, wherein the control unit is configured to control the compressor (4) through the hydraulic motor (5) according to a control law based on an optimization of the performances of the internal combustion engine (2).

5. An assembly comprising an internal combustion engine (2) and a forced induction device according to claim 1, wherein the intake line (15) connects an air outlet of the compressor (4) to the intake manifold, and wherein the exhaust line (16) connects the exhaust manifold to an inlet of the turbine (7).

6. A motor vehicle (1) comprising the assembly according to claim 5.

* * * * *